United States Patent [19]
Yato et al.

[11] Patent Number: 5,425,127
[45] Date of Patent: Jun. 13, 1995

[54] SPEECH RECOGNITION METHOD

[75] Inventors: Fumihiro Yato, Nara; Kazuya Takeda, Fujimi; Shingo Kuroiwa, Tokyo, all of Japan

[73] Assignee: Kokusai Denshin Denwa Company, Limited, Tokyo, Japan

[21] Appl. No.: 896,247

[22] Filed: Jun. 10, 1992

[30] Foreign Application Priority Data

Jun. 19, 1991 [JP] Japan ................................ 3-173349

[51] Int. Cl.$^6$ .............................................. G10L 5/06
[52] U.S. Cl. .................................. 395/2.43; 395/2.62
[58] Field of Search ...................... 381/43, 46, 45, 42; 395/2, 2.43, 2.55, 2.62, 2.6, 2.4, 2.14

[56] References Cited

U.S. PATENT DOCUMENTS

| | | | |
|---|---|---|---|
| 4,340,797 | 7/1982 | Takano et al. | 219/714 |
| 4,340,798 | 7/1982 | Ueda et al. | 219/714 |
| 4,885,791 | 12/1989 | Fujii et al. | 381/43 |
| 5,220,609 | 6/1993 | Watanabe et al. | 381/43 |
| 5,220,610 | 6/1993 | Kane et al. | 381/46 |

*Primary Examiner*—David D. Knepper
*Attorney, Agent, or Firm*—Jordan and Hamburg

[57] ABSTRACT

This invention relates to a method of recognizing input speech of many unspecific people. Feature parameters representing both a short-time average spectrum envelope characteristic of the input speech, and regression coefficients obtained from the outputs from a wide-band filter bank. The regression coefficients represent the rough directionality of the characteristic of change in the spectrum of the speech signal. Distance is measured between the feature parameters and standard patterns stored in a storage means. The distance between the feature parameters and the stored pattern which is smallest of all the patterns is found to recognize said input speech.

8 Claims, 2 Drawing Sheets

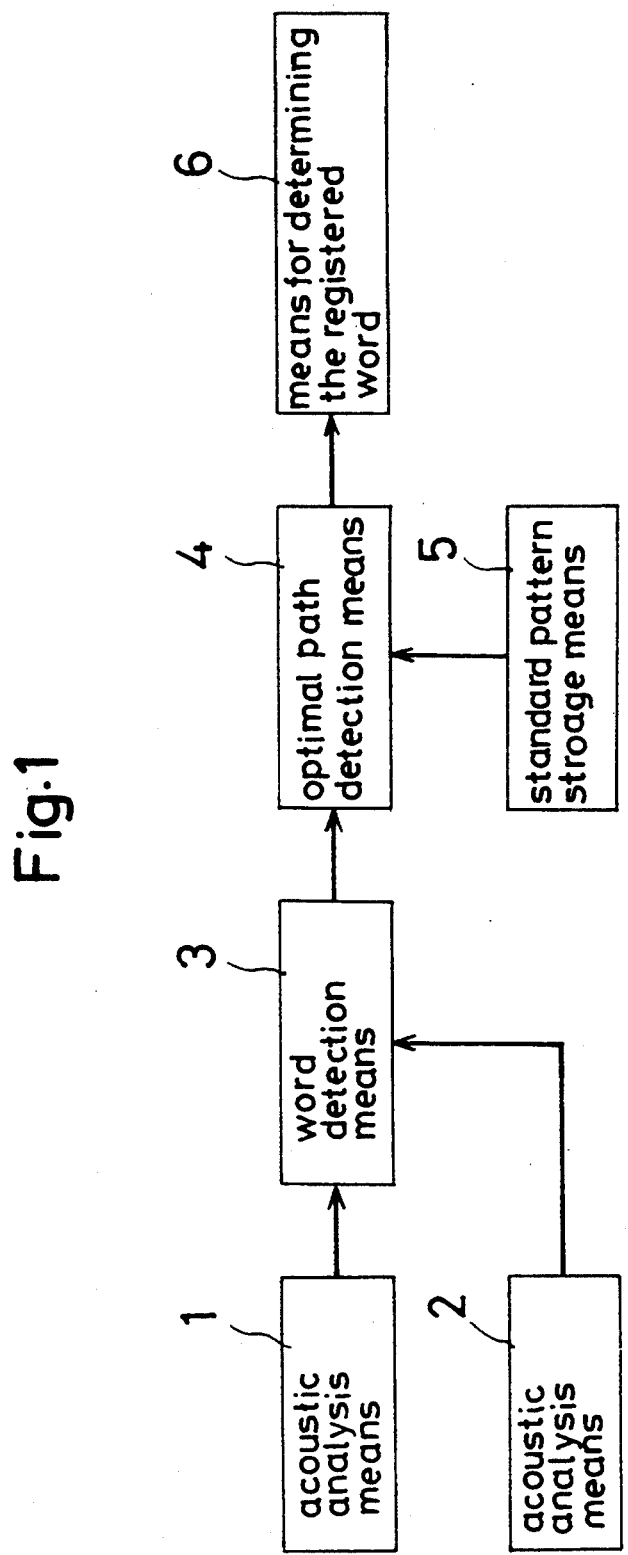

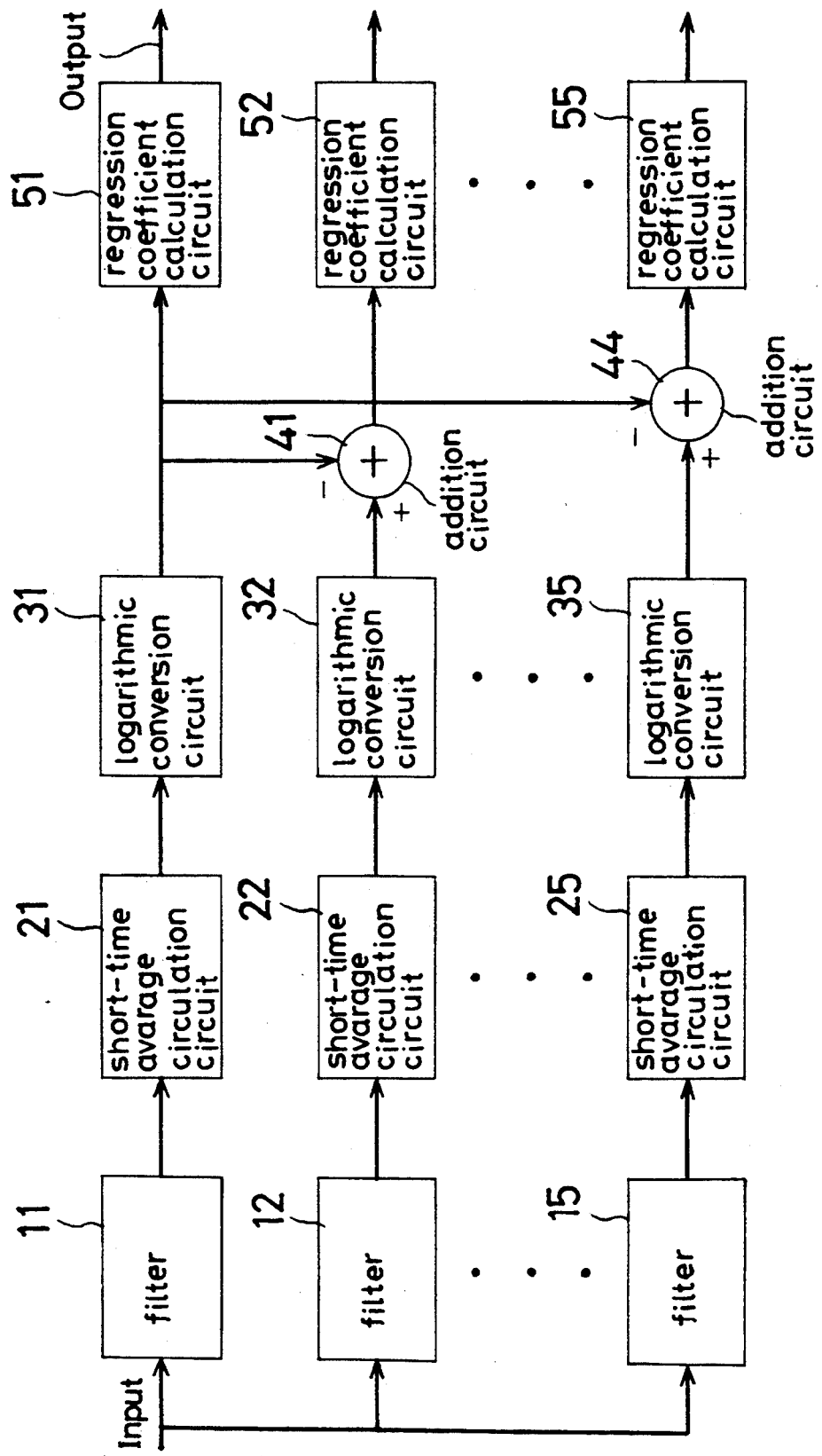

ID METHOD

BACKGROUND OF THE INVENTION

The present invention relates to a method of recognizing voices, and more particularly relates to a method of recognizing the voices of many unspecific people.

Voice recognition methods are widely used in fields including one where a manual input means is not used at works such as the sorting of parcels. One of the methods is for many unspecific people in particular, and is required to recognize their speech with high accuracy all the time whether they are young, old, male or female. In this conventional method, the average output from a narrow-band filter bank, LPC coefficients, LPC Cepstrum coefficients or the like, which represents the short-time average spectrum envelope characteristic of a speech signal at every prescribed time interval, is used as a feature parameter for the speech signal. Along with that, a regression coefficient representing the direction of the change in the feature parameter for a number of analysis intervals is often used as a parameter representing the characteristic of the change in the spectrum of the speech signal in order to improve the performance of the recognition. To recognize the utterance of the word in the method, the correspondence which is between the feature of the speech signal entered into an apparatus for practicing the method, and one of standard patterns stored in advance for the words in the apparatus, and about which the distance between the feature and the standard pattern is the smallest of all the standard patterns is found out through dynamic programming. The word for which the correspondence is thus found out is regarded as that applied to the apparatus.

Since the voices of the many unspecific people differ from each other in quality, it is difficult to thoroughly grasp the difference between the personal vocal characteristics of the people even if a plurality of standard patterns are prepared for each word in advance. For that reason, it is likely that the distance between the feature of an speech signal for a word applied to the apparatus, and the wrong standard pattern for the word is judged to be the smallest of all the patterns, through dynamic programming, and another word corresponding to the wrong standard pattern is regarded as that applied to the apparatus. This is a problem.

SUMMARY OF THE INVENTION

The present invention was made in order to solve the problem. Accordingly, it is an object of the invention to provide a method of recognizing the voices of many unspecific people at a high ratio of accuracy.

The method is characterized in that a combination of parameters representing the short-time average spectrum envelope characteristic of an speech signal, and parameters which are regression coefficients obtained from the outputs from a wide-band filter bank and represent the rough directionality of the spectrum change characteristic of the speech signal, which relatively slightly differs from person to person, is used as acoustic parameters for the word in order to recognize the word at the high ratio of accuracy.

DESCRIPTION OF THE DRAWINGS

FIG. 1 is a block diagram of a speech recognition apparatus for practicing a speech recognition method which is an embodiment of the present invention; and FIG. 2 is a block diagram of an acoustic analysis means included in the apparatus in order to determine regression coefficients from the outputs from a wide-band filter bank.

DETAILED DESCRIPTION OF EXEMPLARY EMBODIMENT

An embodiment of the present invention is hereafter described in detail with reference to the drawings attached hereto.

FIG. 1 shows the constitution and operation of a speech recognition apparatus for practicing a speech recognition method which is the embodiment. Although the method is used to recognize each of words applied as input words to the apparatus, the method can be easily extended to be used to recognize mutually continuous speech. The apparatus includes acoustic analysis means 1 and 2 for subjecting each input word to acoustic analysis in every short time of about 10 msec to change the speech into a paradigm of feature parameters; a word detection means 3 for finding out the beginning and end of the word; an optimal path detection means 4 for finding out the correspondence which is between the paradigm of feature parameters and one of the standard patterns of registered words and about which the distance between the paradigm and the standard pattern is the smallest of all the standard patterns; a standard pattern storage means 5 for storing the standard patterns in the apparatus; and a means 6 for determining the registered word, the distance between the standard pattern of which and the paradigm of feature parameters is the smallest of all the patterns.

The method is described in detail from now on. Although the description is made on condition that each of the words is applied to the apparatus through a telephone line and the range of acoustic frequency of the speech is from 0.3 kHz to 3.4 kHz, the method can be easily extended for a wider range of acoustic frequency of speech which are applied to the apparatus through a microphone. A speech signal for the input word is subjected to linear prediction analysis by the acoustic analysis means 1 so that linear prediction coefficients are obtained. The coefficients are converted into Cepstrum LPC coefficients which are appropriate to represent the spectrum envelope characteristic of the speech, and are sent out from the means 1. The speech signal is also subjected to filter bank analysis by the other acoustic analysis means 2 so that the regression coefficients of the output values from the filters 11, 12, 13, 14 and 15 of the means are obtained and then sent out as the feature parameters representing the characteristic of the change in the spectrum of the speech.

FIG. 2 shows the constitution and operation of the acoustic analysis means 2 including the filters 11, 12, 13, 14 and 15 for five mutually-overlapped ranges of acoustic frequency, which are a range (1) from 0.3 kHz to 3.4 kHz, a range (2) from 0.3 kHz to 1.0 kHz, a range (3) from 0.3 kHz to 0.65 kHz, a range (4) from 1.5 kHz to 3.4 kHz, and a range (5) from 0.65 kHz to 2.8 kHz, and constitutes a wide entire range. In the conventional method, about ten narrow-band filters are provided to cover an entire range of acoustic frequency from 0.3 kHz to 3.4 kHz without overlapping the ranges of the filters with each other. The short-time average energy values of the outputs from the filters 11, 12, 13, 14 and 15 are calculated by the short-time average calculation circuits 21, 22, 23, 24 and 25 of the means 2 at every analysis period, and then converted into values in decibel by the logarithmic conversion circuits 31, 32, 33, 34 and 35 of the means. The output from the filter 11, which represents the total energy value of the speech over the wide entire range, is subtracted from those from the other filters 12, 13, 14 and 15 by the addition circuits 41, 42, 43, 44 of the means 2 so that normalized output values are obtained. The regression coefficients are calculated from the normalized output values at two different analysis time points by the regression coefficient calculation circuits 51, 52, 53, 54 and 55 of the means 2 in accordance with a formula below. In the formula, Ek(t), ERk(t) and S denote the normalized output value for the filter k at the analysis time point t, the regression coefficient from the output value, and a normalized coefficient for calculating the regression coefficient, respectively.

$$ERk(t) = \left( \sum_{n=-2}^{2} - n * Ek(t + n) \right) / S$$

The regression coefficients are sent out as the results of the analysis by the acoustic analysis means 2. Since data at the two analysis time points succeeding an original analysis time point are needed in the acoustic analysis means 2 and the processing thereby is therefore delayed by the two analysis time points from the original one, the processing by the other acoustic analysis 1 is purposely delayed by the two analysis time points in order to synchronize the output from the means with that from the former.

The beginning and end of the word are found out from the feature parameters for the speech by the word detection means 3. The correspondence which is between the paradigm of the feature parameters sent out from the word detection means 3, and one of the standard patterns of the registered words stored in the standard pattern storage means 5, and about which the distance between the paradigm of the feature parameters and the standard pattern is the smallest of all the standard patterns is found out by the optimal path detection means 4 through matching based on dynamic programming such as continuous dynamic programming. At that time, the distance between the paradigm of the feature parameters for the input word and that of the feature parameters for the standard pattern is determined by multiplying the Euclidean distance between the regression coefficients from the outputs from the filter bank of the acoustic analysis means 2 by 0.1 and then adding the product to the Euclidean distance between the LPC Cepstrum coefficients. The smallest distance is thus found out as to all the standard patterns. The registered word having the smallest distance, is sent out as the result of the recognition in the method.

In the method, the regression coefficients calculated from the short-time average output values from the filters 11, 12, 13, 14 and 15 for the wide range of acoustic frequency and less dependent on the person having made the input word are used as the parameters representing the characteristic of the change in the spectrum of the word. For that reason, the voices of many unspecific people can be more accurately recognized in the method than in a conventional art in which regression coefficients for LPC Cepstrum coefficients are used. When a word recognition test was actually conducted on the conventional art for 167 main Japanese surnames each pronounced by eight men and eight women, the ratio of the wrong recognition of their voices for the surnames in the art was 11.3%. When the same test was actually conducted on the method which is the embodiment, the ratio of the wrong recognition of the voices for the surnames in the method was 5.4% which was nearly a 6% improvement over the former.

The present invention is not confined to the above-described embodiment, but may be embodied or practiced in other various ways without departing from the spirit or essential character of the invention.

What is claimed is:

1. A method of recognizing input speech of many unspecific people, comprising the steps of:
   obtaining feature parameters of said input speech by:
   determining parameters representing a short-time average spectrum envelope characteristic of a speech signal from the input speech, and
   determining parameters which are regression coefficients obtained from outputs from a wide-band filter bank and which represent a rough directionality of a characteristic of a change in a spectrum of said speech signal; and
   determining correspondence between said combination and one of a plurality of standard patterns stored in a storage means such that a distance between said combination and said one pattern is the smallest of all said patterns so as to recognize said input speech;
   said step of determining said parameters which are regression coefficients, includes the steps of:
   filtering said speech signal in a plurality of filters having mutually overlapped frequency ranges;
   calculating short-time average energy values of outputs of said filters, including a short-time average energy value which represents a total energy of said speech signal over the entire frequency range;
   normalizing said short-time average energy values by subtracting said short-time average energy value which represents said total energy from the remaining short-time average energy values;
   calculating said regression coefficients from said normalized short-time average energy values.

2. A method according to claim 1, wherein said step of calculating said regression coefficients includes the step of performing said calculation in accordance with the equation:

$$ERk(t) = \left( \sum_{n=-2}^{2} - n * Ek(t + n) \right) / S$$

where Ek(t) represents a normalized output from said filters, ERk(t) represents the regression coefficients and S represents normalized coefficients for calculating the regression coefficients.

3. A method according to claim 1, wherein said step of determining said parameters which are regression coefficients includes the step of logarithmically converting said short-time average energy values prior to said step of normalizing said short-time average energy values.

4. A method of recognizing input speech of many unspecific people, comprising the steps of:

obtaining feature parameters of said input speech by:
determining parameters representing a short-time average spectrum envelope characteristic of a speech signal from the input speech, and
determining parameters which are regression coefficients obtained from outputs from a wide-band filter bank and which represent a rough directionality of a characteristic of a change in a spectrum of said speech signal;
determining correspondence between said combination and one of a plurality of standard patterns stored in a storage means such that a distance between said combination and said one pattern is the smallest of all said patterns so as to recognize said input speech; and
delaying said parameters representing the short-time average spectrum envelope characteristic of the speech signal for the input speech, relative to said parameters which are regression coefficients, prior to said step of determining.

5. A method of recognizing input speech of many unspecific people, comprising the steps of:
determining parameters representing a short-time average spectrum envelope characteristic of a speech signal for the input speech;
determining parameters which are regression coefficients obtained from outputs from a wide-band filter bank and which represent a rough directionality of a characteristic of a change in a spectrum of said signal;
obtaining feature parameters of said input speech from a combination of:
said parameters representing the short-time average spectrum envelope characteristic of the speech signal for the input speech, and
said parameters which are regression coefficients obtained from outputs from the wide-band filter bank and which represent the rough directionality of the characteristic of the change in the spectrum of said speech signal;
detecting a start and end to each word of said input speech from said combination; and
determining correspondence between said combination for each word and one of a plurality of standard patterns stored in a storage means such that a distance between said combination and said one pattern is the smallest of all said patterns so as to recognize said input speech;
said step of determining said parameters which are regression coefficients, includes the steps of:
filtering said speech signal in a plurality of filters having mutually overlapped frequency ranges;
calculating short-time average energy values of outputs of said filters, including a short-time average energy value which represents a total energy of said speech signal over the entire frequency range;
normalizing said short-time average energy values by subtracting said short-time average energy value which represents said total energy from the remaining short-time average energy values;
calculating said regression coefficients from said normalized short-time average energy values.

6. A method according to claim 5, wherein said step of calculating said regression coefficients includes the step of performing said calculation in accordance with the equation:

$$ERk(t) = \left( \sum_{n=-2}^{2} - n * Ek(t + n) \right)/S$$

where Ek(t) represents a normalized output from said filters, ERk(t) represents the regression coefficients and S represents normalized coefficients for calculating the regression coefficients.

7. A method according to claim 5, wherein said step of determining said parameters which are regression coefficients includes the step of logarithmically converting said short-time average energy values prior to said step of normalizing said short-time average energy values.

8. A method of recognizing input speech of many unspecific people, comprising the steps of:
determining parameters representing a short-time average spectrum envelope characteristic of a speech signal for the input speech;
determining parameters which are regression coefficients obtained from outputs from a wide-band filter bank and which represent a rough directionality of a characteristic of a change in a spectrum of said speech signal;
obtaining feature parameters of said input speech from a combination of:
said parameters representing the short-time average spectrum envelope characteristic of the speech signal for the input speech, and
said parameters which are regression coefficients obtained from outputs from the wide-band filter bank and which represent the rough directionality of the characteristic of the change in the spectrum of said signal;
detecting a start and end to each word of said input speech from said combination;
determining correspondence between said combination for each word and one of a plurality of standard patterns stored in a storage means such that a distance between said combination and said one pattern is the smallest of all said patterns so as to recognize said input speech;
delaying said parameters representing the short-time average spectrum envelope characteristic of the speech signal for the input speech, relative to said parameters which are regression coefficients, prior to said step of determining.

* * * * *